United States Patent
Osakabe et al.

(10) Patent No.: US 8,941,877 B2
(45) Date of Patent: Jan. 27, 2015

(54) IMAGE SCANNING DEVICE

(71) Applicants: Yoshinori Osakabe, Seto (JP); Katsuro Miura, Toyota (JP); Muneaki Takahata, Toyoake (JP)

(72) Inventors: Yoshinori Osakabe, Seto (JP); Katsuro Miura, Toyota (JP); Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/755,259

(22) Filed: Jan. 31, 2013

(65) Prior Publication Data

US 2013/0235433 A1 Sep. 12, 2013

Related U.S. Application Data

(63) Continuation-in-part of application No. 13/417,383, filed on Mar. 12, 2012.

(30) Foreign Application Priority Data

Mar. 30, 2012 (JP) ................................ 2012-081324

(51) Int. Cl.
*G06K 15/00* (2006.01)
*H04N 1/12* (2006.01)
*H04N 1/00* (2006.01)
(Continued)

(52) U.S. Cl.
CPC ........... *H04N 1/126* (2013.01); *H04N 1/00543* (2013.01); *H04N 1/00612* (2013.01); *H04N 1/0615* (2013.01); *H04N 1/00633* (2013.01); *H04N 1/0062* (2013.01);
(Continued)

(58) Field of Classification Search
None
See application file for complete search history.

(56) References Cited

U.S. PATENT DOCUMENTS 6,027,108 A 2/2000 Johdai et al.
6,126,163 A 10/2000 Katsuta et al.
(Continued)

FOREIGN PATENT DOCUMENTS

JP 61-124467 A 6/1986
JP 61-269140 A 11/1986
(Continued)

OTHER PUBLICATIONS

JP Notice of Reasons for Rejection mailed Jan. 14, 2014, JP App. 2011-218078, English translation.
(Continued)

*Primary Examiner* — Kimberly A Williams
*Assistant Examiner* — Helen Q Zong
(74) *Attorney, Agent, or Firm* — Banner & Witcoff, Ltd.

(57) ABSTRACT

A conveying mechanism is disposed inside a housing of an image scanning device and is configured to convey the sheet along a common path to the scanning position in a first direction, and to convey the sheet having passed the scanning position selectively along a return path in a second direction and along a one-way path in the first direction. A scanning unit disposed inside the housing scans, at the scanning position, an image of a sheet. The discharge cover is openably and closably disposed in the housing and is configured, when open relative to the housing, to define a discharge port and receive the sheet conveyed along the one-way path and discharged through the discharge port. The maintenance cover is openably and closably disposed in the housing and is configured, when open relative to the housing, to expose the one-way path and the return path.

17 Claims, 12 Drawing Sheets

(51) Int. Cl.
*H04N 1/10* (2006.01)
*H04N 1/193* (2006.01)

(52) U.S. Cl.
CPC ........... *H04N 1/1017* (2013.01); *H04N 1/1215* (2013.01); *H04N 1/193* (2013.01); *H04N 2201/0081* (2013.01)
USPC ........... 358/1.2; 358/1.13; 358/498; 271/4.01

(56) References Cited

U.S. PATENT DOCUMENTS

| | | |
|---|---|---|
| 6,321,064 B1 | 11/2001 | Mizubata et al. |
| 6,612,561 B2 | 9/2003 | Sekine |
| 6,882,822 B2 | 4/2005 | Gomi et al. |
| 7,016,090 B2 | 3/2006 | Sekine |
| 7,595,903 B2 | 9/2009 | Kizaki et al. |
| 7,637,502 B2 | 12/2009 | Ata et al. |
| 7,726,650 B2 | 6/2010 | Tu |
| 7,731,779 B2 | 6/2010 | Palumbo |
| 7,826,105 B2 | 11/2010 | Yamaguchi |
| 7,883,285 B2 | 2/2011 | Asada et al. |
| 7,941,068 B2 | 5/2011 | Kimura |
| 7,976,020 B2 | 7/2011 | Awai |
| 8,020,853 B2 | 9/2011 | Shiraki et al. |
| 8,104,765 B2 | 1/2012 | Tsuchiya et al. |
| 8,109,498 B2 | 2/2012 | Akimatsu |
| 8,172,225 B2 | 5/2012 | Tanahashi |
| 8,177,219 B2 | 5/2012 | Chen et al. |
| 8,235,385 B2 | 8/2012 | Shimizu |
| 8,336,877 B2 | 12/2012 | Yamamoto et al. |
| 8,493,639 B2 | 7/2013 | Samoto et al. |
| 2002/0056957 A1 | 5/2002 | Sekine |
| 2003/0202218 A1 | 10/2003 | Morinaga et al. |
| 2004/0184824 A1 | 9/2004 | Hirai et al. |
| 2005/0212195 A1* | 9/2005 | Ohama et al. ............... 271/4.01 |
| 2008/0175627 A1 | 7/2008 | Sato |
| 2008/0240823 A1 | 10/2008 | Asada |
| 2009/0027744 A1* | 1/2009 | Kim ............................ 358/498 |
| 2009/0072466 A1 | 3/2009 | Shishikura |
| 2009/0295082 A1 | 12/2009 | Awai |
| 2009/0315253 A1 | 12/2009 | Osakabe et al. |
| 2010/0074640 A1* | 3/2010 | Okano ........................... 399/45 |
| 2011/0199654 A1 | 8/2011 | Takata |
| 2011/0273753 A1* | 11/2011 | Yonemura et al. ............ 358/498 |
| 2012/0013930 A1* | 1/2012 | Kondo ......................... 358/1.13 |
| 2013/0083336 A1 | 4/2013 | Miura et al. |
| 2013/0083376 A1 | 4/2013 | Miura et al. |
| 2013/0187330 A1 | 7/2013 | Kuroda et al. |
| 2013/0235436 A1 | 9/2013 | Osakabe et al. |
| 2013/0272770 A1 | 10/2013 | Asada et al. |
| 2013/0293930 A1 | 11/2013 | Araki et al. |

FOREIGN PATENT DOCUMENTS

| | | |
|---|---|---|
| JP | 2-291352 A | 12/1990 |
| JP | H06-156846 A | 6/1994 |
| JP | 08-067395 A | 3/1996 |
| JP | 8-133553 A | 5/1996 |
| JP | H09-80836 A | 3/1997 |
| JP | 2821011 B2 | 11/1998 |
| JP | 11-127301 A | 5/1999 |
| JP | 2000-026003 A | 1/2000 |
| JP | 2000-165594 A | 6/2000 |
| JP | 2001-019255 A | 1/2001 |
| JP | 2002-012354 A | 1/2002 |
| JP | 2003-270734 A | 9/2003 |
| JP | 3485651 B2 | 1/2004 |
| JP | 3750643 B2 | 3/2006 |
| JP | 3855475 B2 | 12/2006 |
| JP | 3907852 B2 | 4/2007 |
| JP | 2007-302402 A | 11/2007 |
| JP | 2010-006608 A | 1/2010 |
| JP | 2010-017998 A | 1/2010 |
| JP | 4447764 B2 | 4/2010 |
| JP | 2011-171957 A | 9/2011 |
| JP | 2013-052929 A | 3/2013 |
| JP | 2013-078070 A | 4/2013 |

OTHER PUBLICATIONS

Non-final Office Action received in U.S. Appl. No. 13/417,395 mailed Aug. 15, 2013.
Notice of Allowance issued in U.S. Appl. No. 13/417,395 mailed Nov. 12, 2013.
JP Office Action mailed Oct. 15, 2013, JP Appln. 2011-218079, English translation.
Co-pending U.S. Appl. No. 13/417,395, filed Mar. 12, 2012.
Non-Final Office Action issued in corresponding U.S. Appl. No. 13/417,383 mailed Dec. 20, 2013.
Sep. 3, 2014—(US) Non-Final Office Action—U.S. Appl. No. 14/203,627.
Jul. 22, 2014—(JP) Notice of Reasons for Rejection—App 2012-081324—Eng Tran.
Non-Final Office Action issued in corresponding U.S. Appl. No. 13/755,235, mailed Aug. 1, 2014.
Final Office Action received in corresponding U.S. Appl. No. 13/417,383 mailed Jun. 6, 2014.

\* cited by examiner

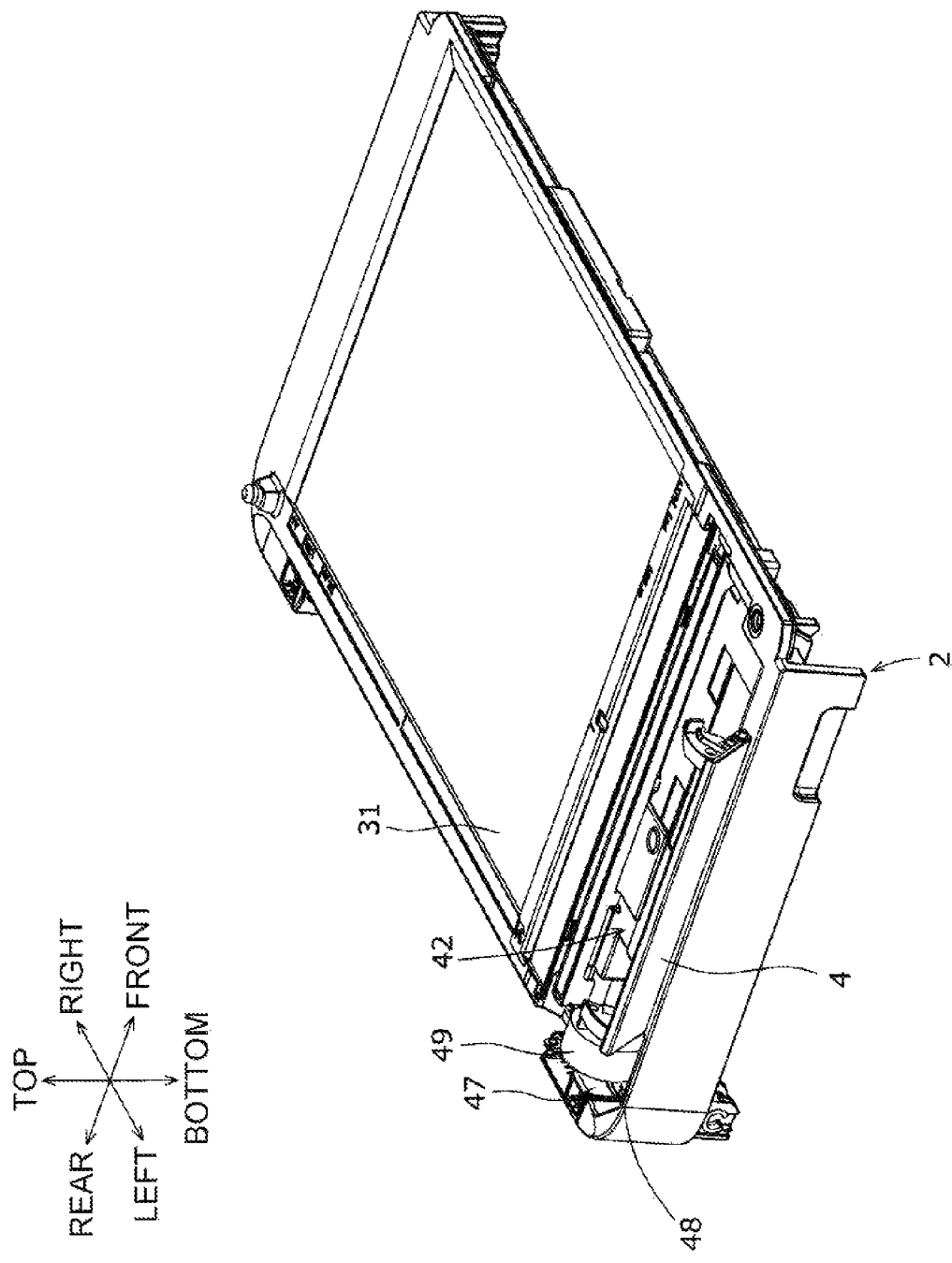

IMAGE SCANNING DEVICE

This is a Continuation-In-Part application of U.S. patent application Ser. No. 13/417,383 filed on Mar. 12, 2012 entitled "IMAGE SCANNING DEVICE," the entire disclosure of which is incorporated herein by reference. This application also claims priority from Japanese Patent Application No. 2012-081324, filed on Mar. 30, 2012, the entire disclosure of which is incorporated herein by reference.

BACKGROUND OF THE INVENTION

1. Field of the Invention

The present invention relates to an image scanning device configured to scan an image of a sheet.

2. Description of Related Art

A known image scanning device comprises a conveying unit configured to convey a sheet to an image scanning unit. The image scanning unit scans an image formed on the sheet when the sheet passes by the image scanning unit.

In a known image scanning device, a sheet is selectively discharged along a U-turn path and a straight path. A pivotal tray is openably and closably disposed on a side surface of a housing of the image scanning device. An inner surface of the pivotal tray is curved in an arched shape. A guide having an arched shape corresponding to the shape of the inner surface of the pivotal tray is disposed inside the housing. When the pivotal tray is closed, the inner surface of the pivotal tray opposes the guide with an interval therebetween to define a U-turn path.

When the pivotal tray is closed, a convey roller conveys a sheet to the U-turn path. When the pivotal tray is open, the U-turn path is not defined and the convey roller conveys a sheet to the straight path and discharges the sheet to a position above the inner surface of the pivotal tray.

When a sheet jam occurs in the U-turn path, the sheet jam can be removed by opening the pivotal tray. The pivotal tray is opened for sheet discharge from the straight path as well as for sheet jam removal. Such a structure may confuse the user about the functions of the pivotal tray.

SUMMARY OF THE INVENTION

Therefore, a need has arisen for an image scanning device that overcomes this and other shortcomings of the related art and provides improved operability for sheet discharge and for sheet jam removal.

According to an embodiment of the invention, an image scanning device comprises a housing, a scanning unit disposed inside the housing and configured to scan, at a scanning position, an image of a sheet, a conveying mechanism, a discharge cover, and a maintenance cover. The conveying mechanism is disposed inside the housing and is configured to convey the sheet along a common path to the scanning position in a first direction, and to convey the sheet having passed the scanning position selectively along a return path in a second direction and along a one-way path in the first direction. The discharge cover is openably and closably disposed in the housing and is configured, when open relative to the housing, to define a discharge port and receive the sheet conveyed along the one-way path and discharged through the discharge port. The maintenance cover is openably and closably disposed in the housing and is configured, when open relative to the housing, to expose the one-way path and the return path.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIG. 12 is a perspective view of a lower portion of the housing of the image scanning device.

DETAILED DESCRIPTION OF EMBODIMENTS

Embodiments of the invention and their features and technical advantages may be understood by referring to FIGS. 1-12, like numerals being used for like corresponding parts in the various drawings.

Figure 1:
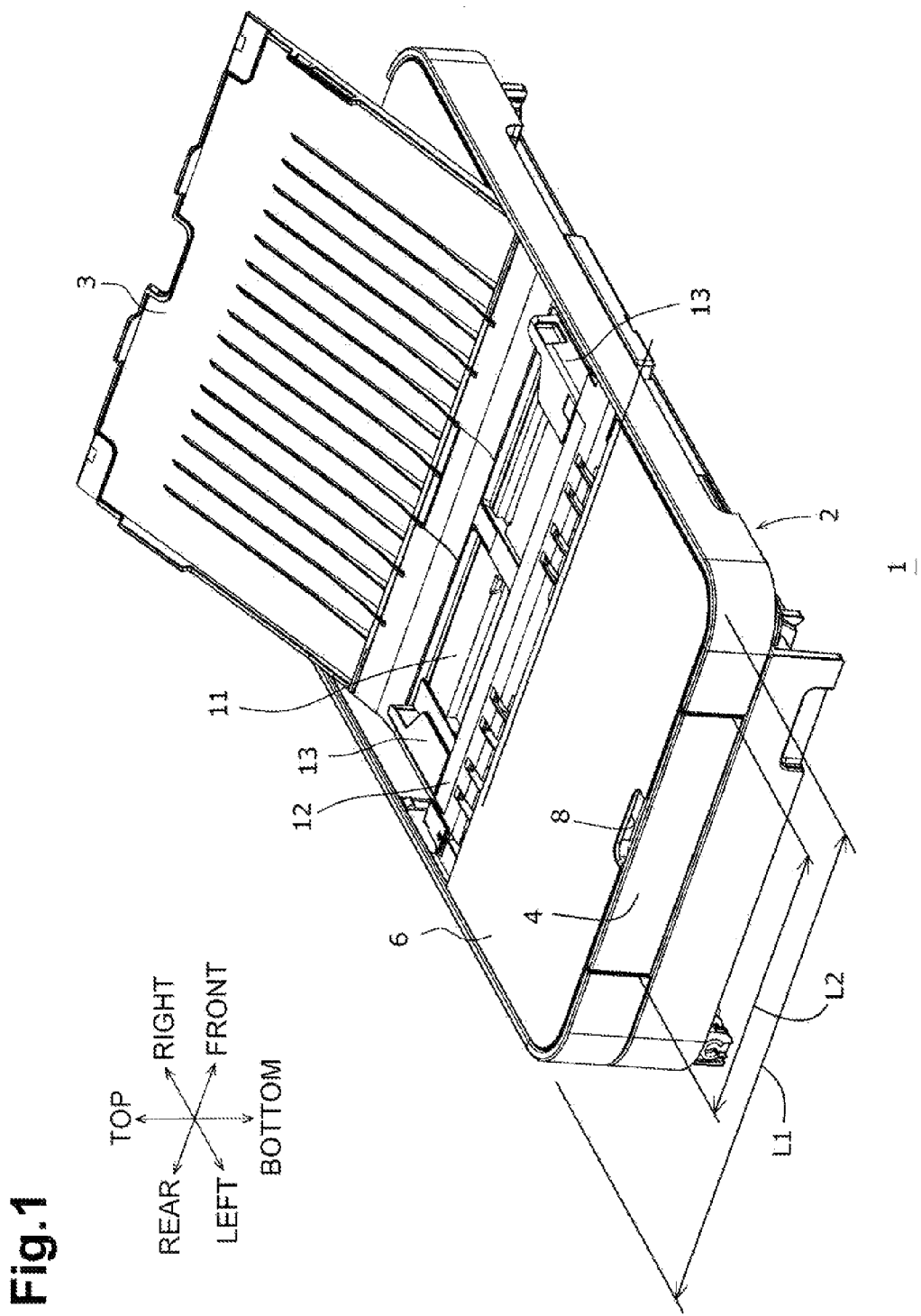
FIG. 1 is a perspective view of an image scanning device with a tray in a use position, as viewed from the front left top.

As shown in FIG. 1 an image scanning device 1 has a substantially rectangular shape in the plan view. For example, the image scanning device 1 may be mounted on a printer (not shown) and constitute together with the printer a multi-function device which is compact in size.

The lengthwise direction of the image scanning device 1 in the plan view is defined as a left-right direction, and a direction perpendicular to the lengthwise direction is defined as a front-rear direction. A direction perpendicular to the left-right direction and the front-rear direction when the multi-function device is placed on a horizontal surface is defined as a top-bottom direction. In each of FIGS. 1-14, the directions thus defined are shown by arrows for better understanding of the figures. Hereinafter, a direction from the right to the left is an example of a first direction. In this case, the right side is upstream in the first direction, and the left side is downstream in the first direction.

The image scanning device comprises a housing 2.

Figure 2:
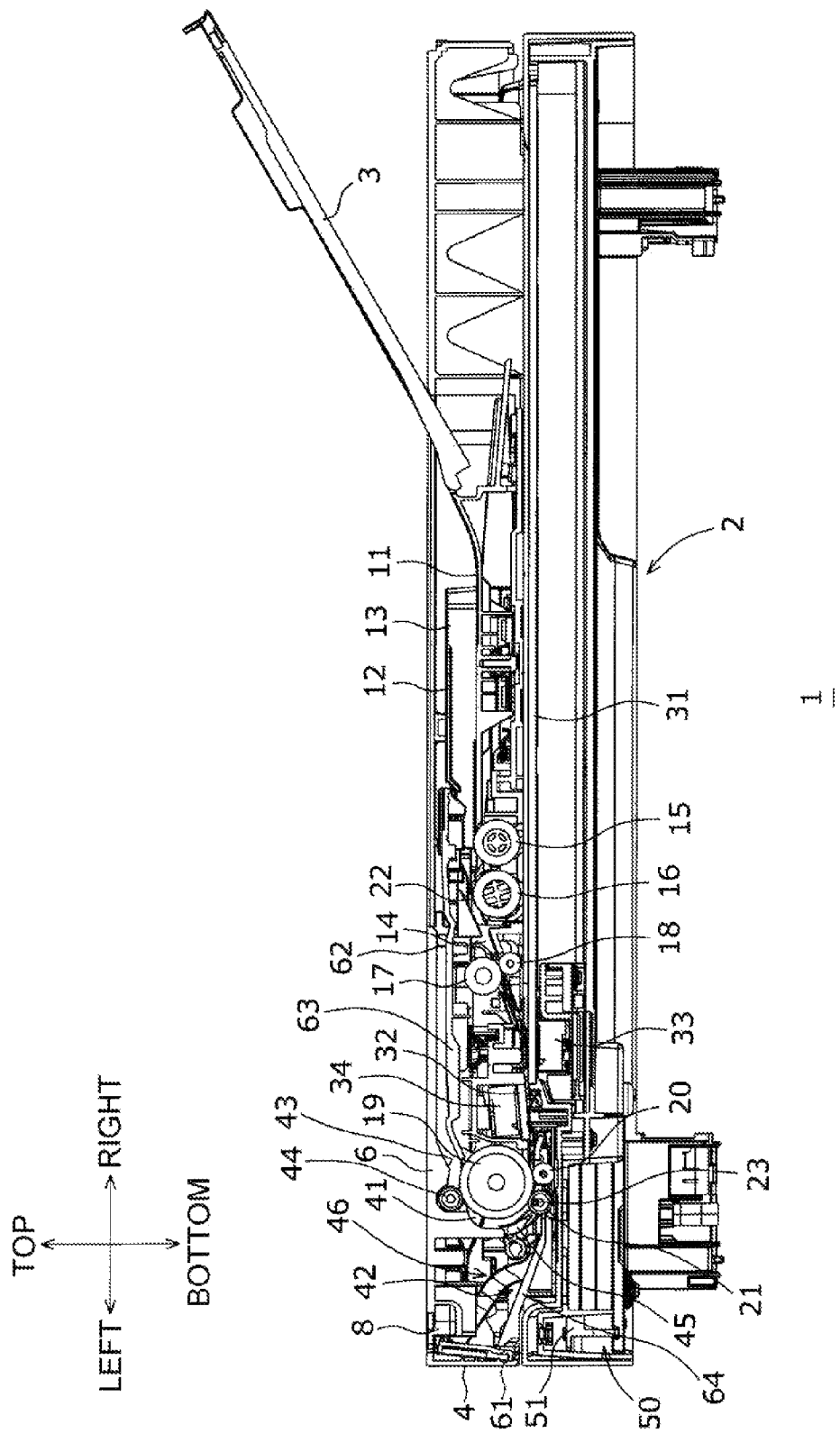
FIG. 2 is a cross-sectional view of the image scanning device of FIG. 1.

A tray 3 is attached to the housing 2. The tray 3 is movable between a non-use position and a use position. An outer surface of the tray 3 in the non-use position forms a central portion of an upper surface of the housing 2 in the left-right direction. In order to move the tray 3 from the non-use position to the use position, a left end of the tray 3 in the non-use position is raised, and the tray 3 is pivoted rightward about its right end. As shown in FIGS. 1 and 2, the tray 3 in the use position extends obliquely upward and rightward.

A discharge cover 4 is disposed on a left side surface of the housing 2. The discharge cover 4 is opened and closed by being pivoted about a pivot shaft 61 which extends in the front-rear direction. The pivot shaft 61 is an example of a first pivot axis. The discharge cover 4 has a substantially rectangular shape having a width in the front-rear direction shorter than the left side surface of the housing 2.

Figure 3:
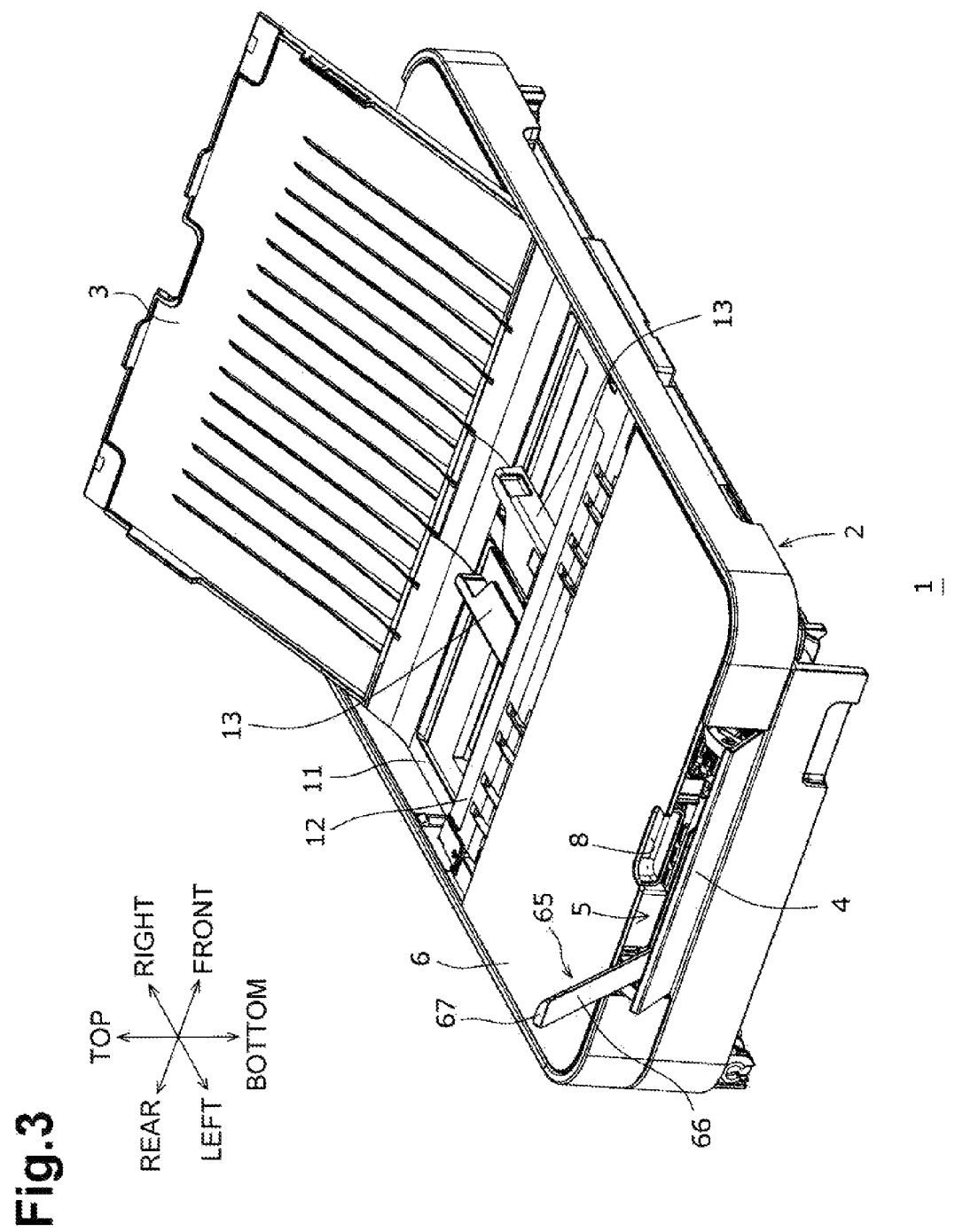
FIG. 3 is a perspective view of the image scanning device with a discharge cover open, as viewed from the front left top.
Figure 4:
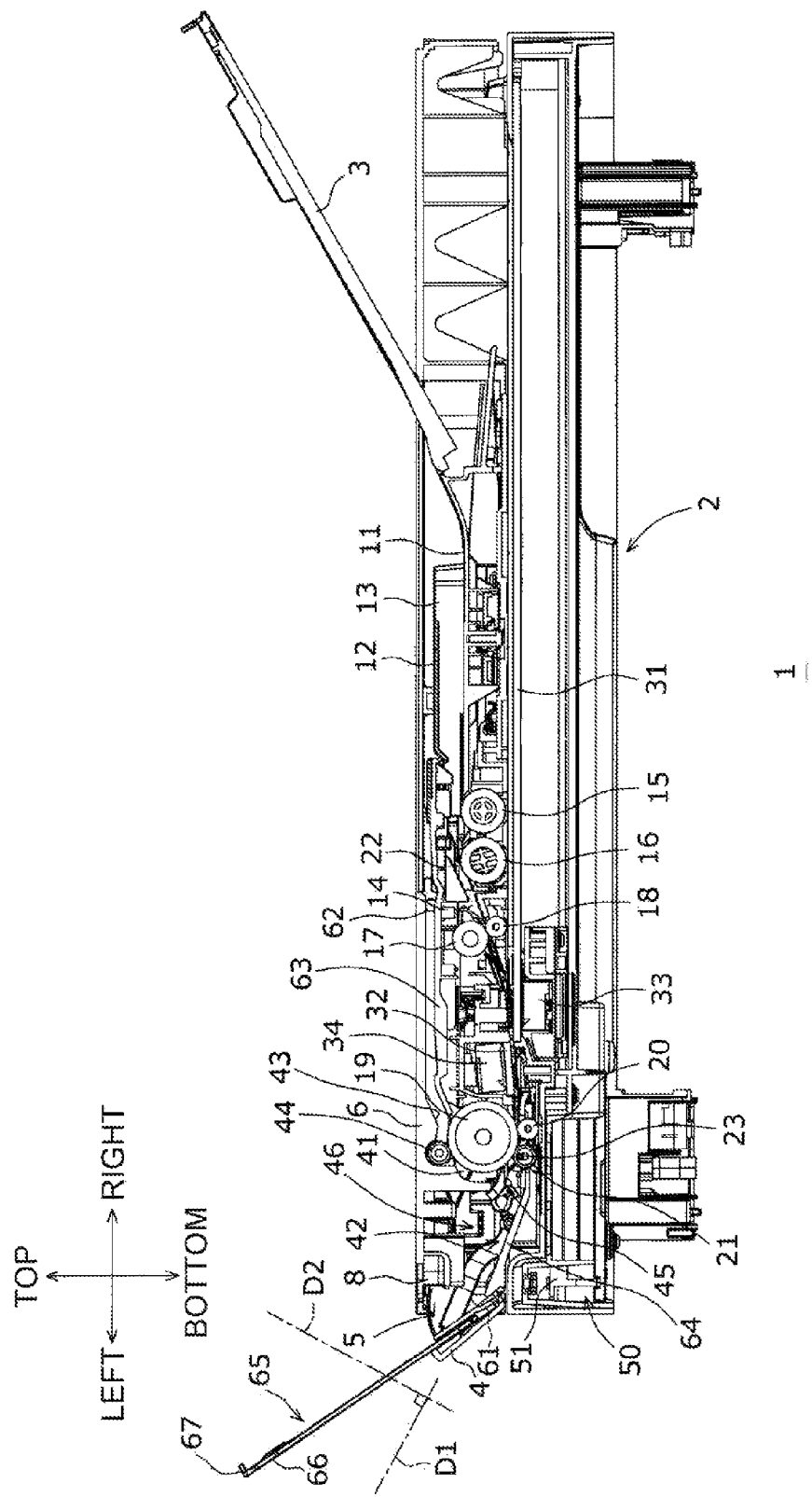
FIG. 4 is a cross-sectional view of the image scanning device of FIG. 3.

The pivot shaft 61 extends along a lower edge of the discharge cover 4. As shown in FIGS. 1 and 2, when the discharge cover 4 is closed, an outer surface of the discharge cover 4 forms a central portion of the left side surface of the housing 2 in the front-rear direction. As shown in FIGS. 3 and 4, when the discharge cover 4 is open, the discharge cover 4 extends obliquely upward and leftward at an angle of approximately 50 degrees relative to a horizontal surface HS. In this state, as shown in FIG. 4, the discharge cover 4 extends from a one-way path 42 (to be described later) and is inclined relative to the one-way path in a direction between a direction D1 parallel to a one-way path 42 and a direction D2 perpendicular to the one-way path 42. The discharge tray 4 which is open and the housing 2 define a discharge port 5.

A maintenance cover 6 is disposed at a left end portion of the upper surface of the housing 2. The maintenance cover 6 is opened and closed by being pivoted about a pivot shaft 62 which extends in the front-rear direction. The maintenance cover 6 has a substantially rectangular plate shape having a length L1 in the front-rear direction which is substantially equal to a length in the front-rear direction of the upper surface of the housing 2. The length L1 of the maintenance cover 6 is greater than a length L2 in the front-rear direction of the discharge cover 4. The length L2 is smaller than the left side surface of the housing 2.

Figure 5:
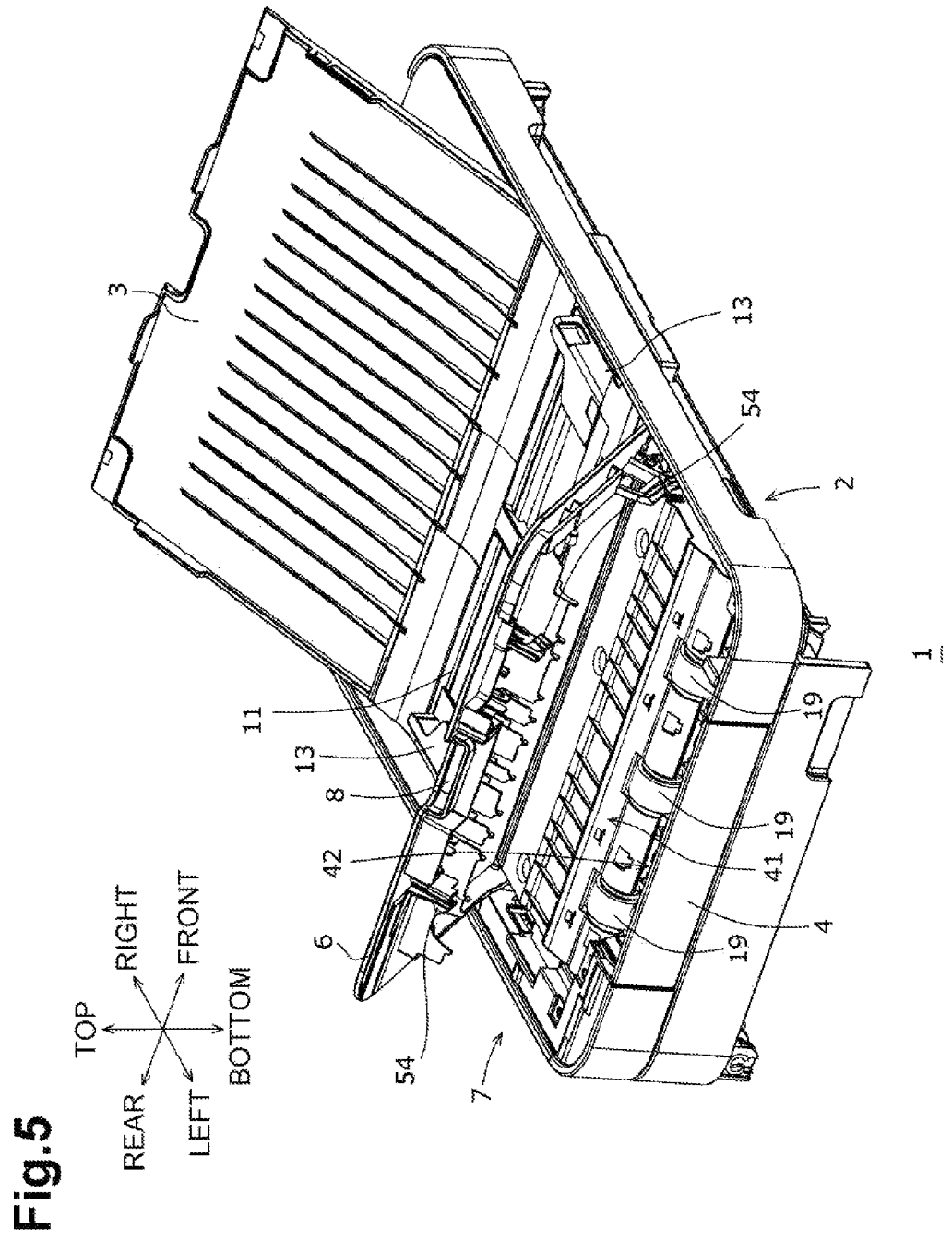
FIG. 5 is a perspective view of the image scanning device with a maintenance cover open, as viewed from the front left top.
Figure 6:
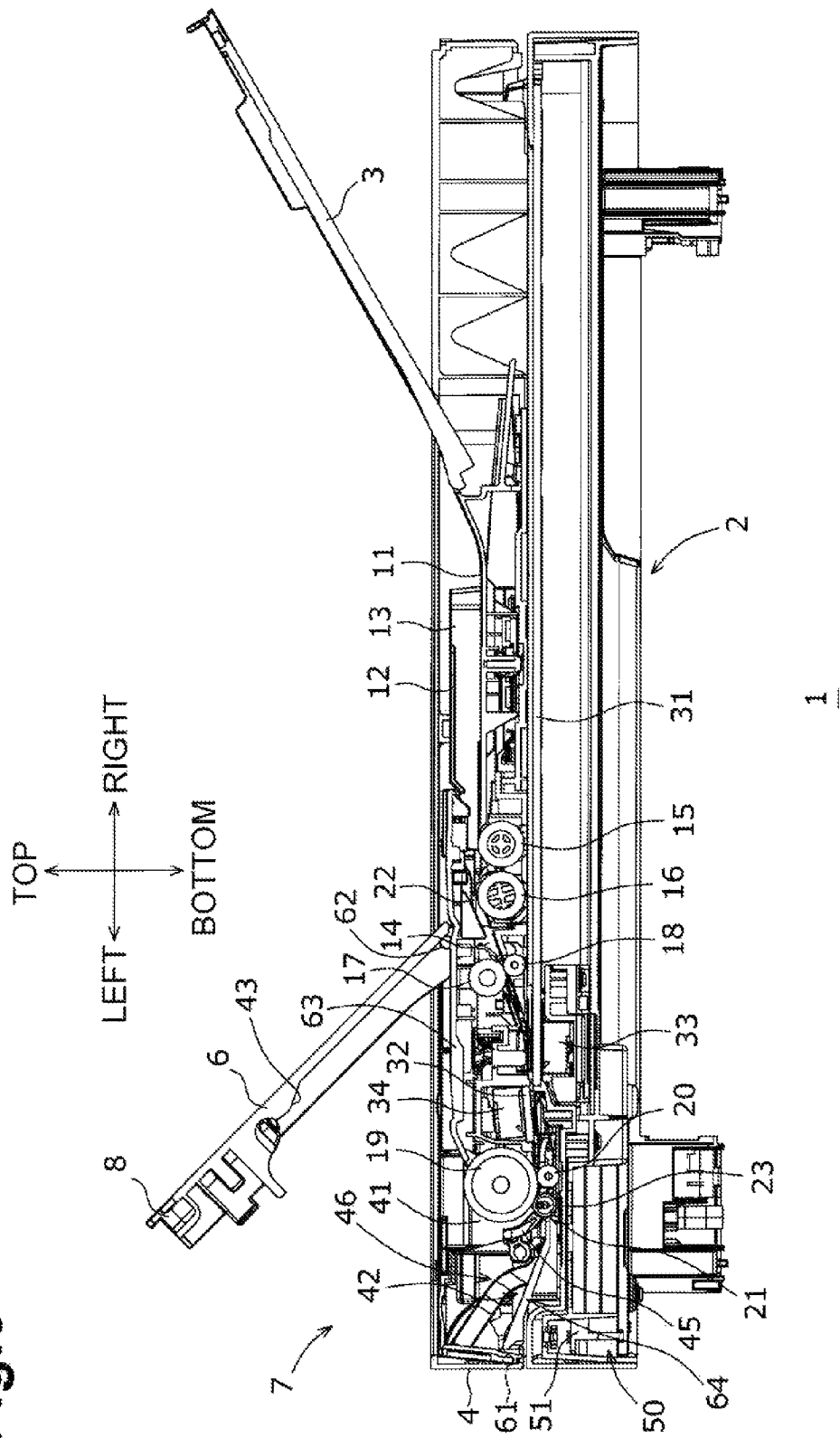
FIG. 6 is a cross-sectional view of the image scanning device of FIG. 5.

The pivot shaft 62 extends along a right edge of the maintenance cover 6. As shown in FIGS. 1 and 2, when the maintenance cover 6 is closed, an outer surface of the maintenance cover 6 forms the left end portion of the upper surface of the housing 2. As shown in FIGS. 5 and 6, the maintenance cover 6 which is open extends obliquely upward and leftward. In this state, the maintenance cover 6 and the housing 2 define a maintenance opening 7 through which a return path 41 (to be described later) and the one-way path 42 are exposed.

Figure 7:
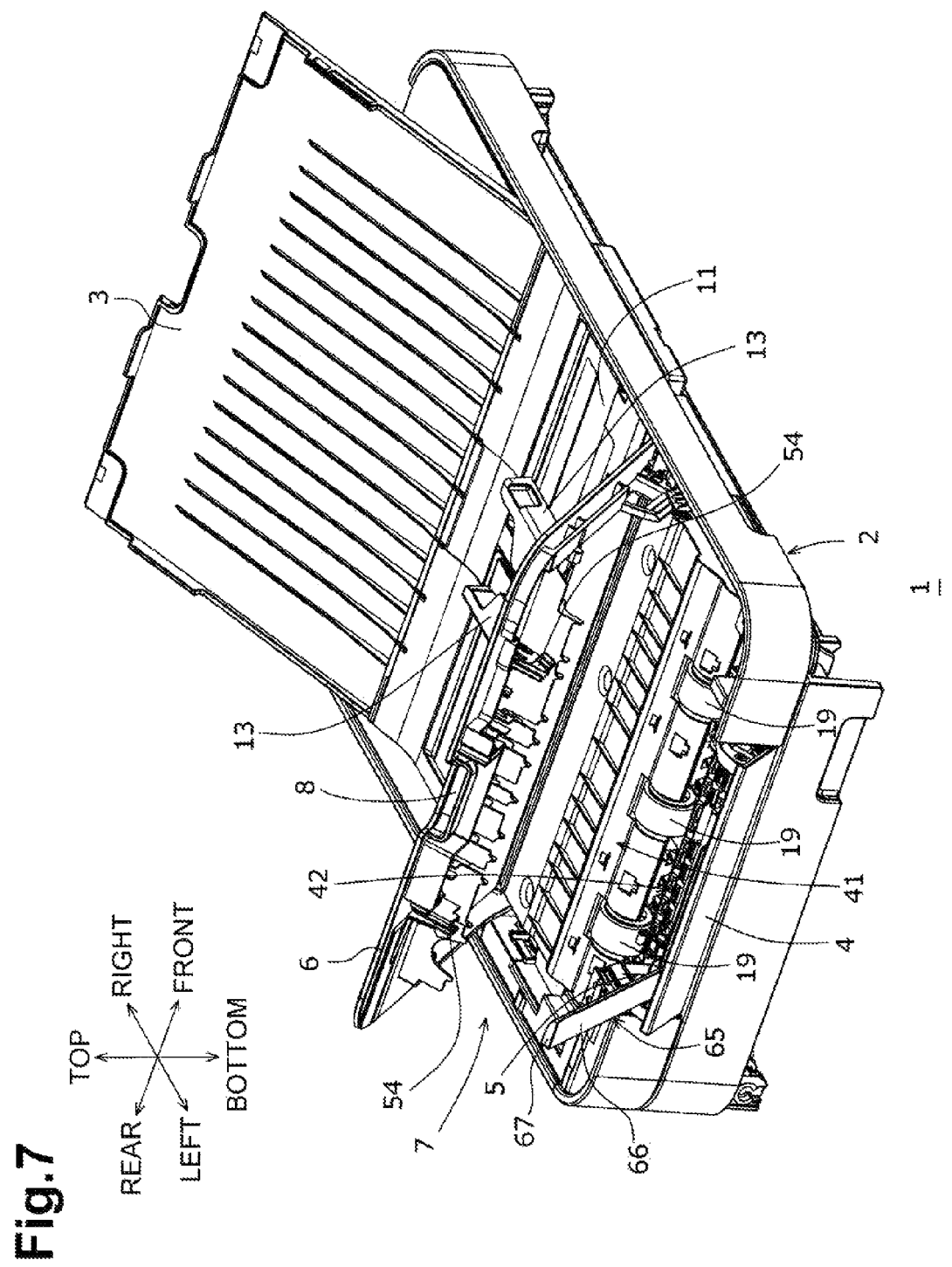
FIG. 7 is a perspective view of the image scanning device with a discharge cover and a maintenance cover open, as viewed from the front left top.
Figure 8:
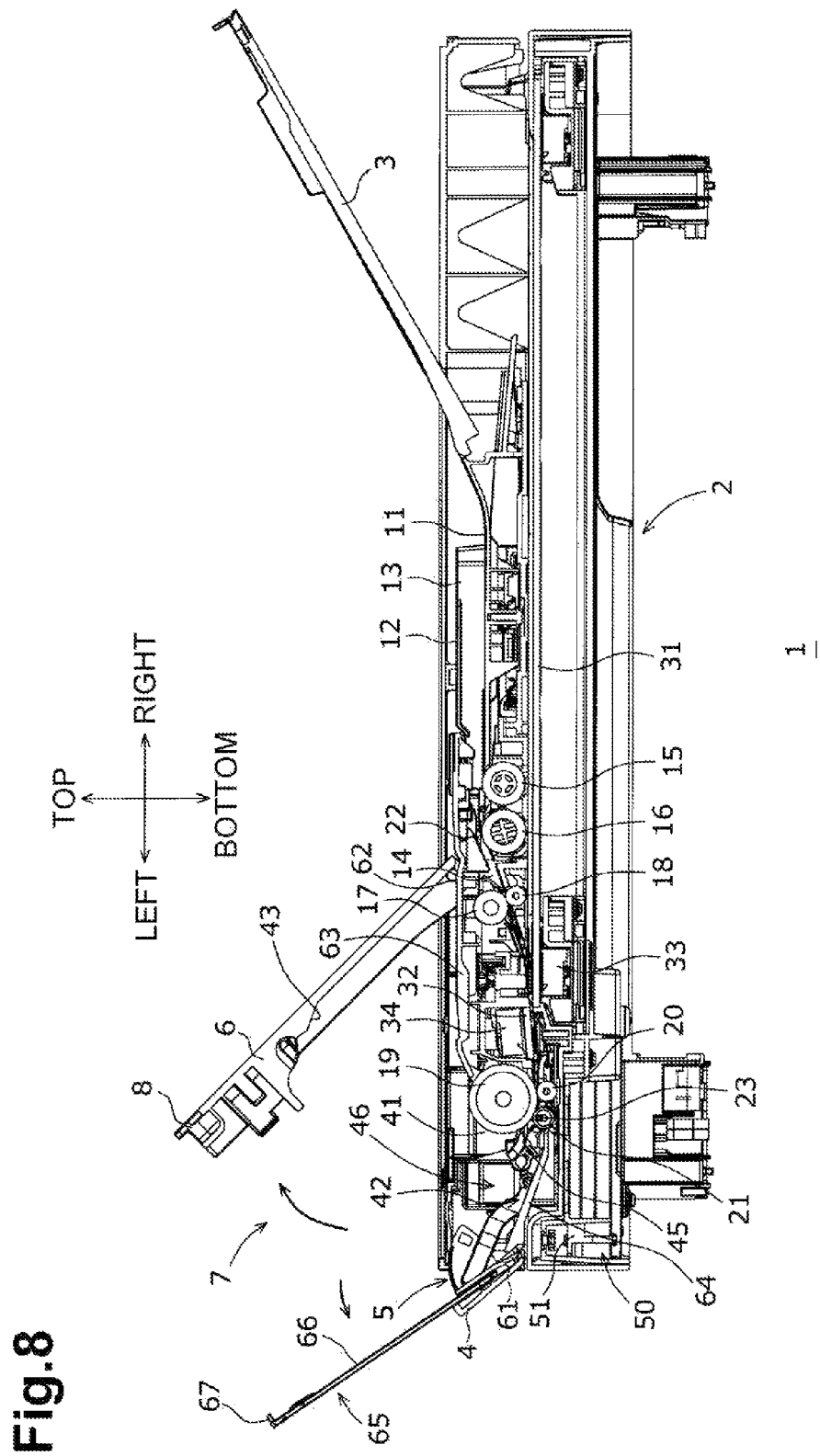
FIG. 8 is a cross-sectional view of the image scanning device of FIG. 7.

As shown in FIGS. 7 and 8, when the discharge cover 4 and the maintenance cover 6 are both open, the discharge port 5 and the maintenance opening 7 communicate with each other to define a larger opening through which the inside of the housing 2 is easily visible.

As shown in FIGS. 1 and 2, when the discharge cover 4 and the maintenance cover 6 are both closed, an upper edge of the discharge cover 4 and a left edge of the maintenance cover 6 butt against each other while leaving little clearance and extend in the front-rear direction.

A finger recess 8, which is an example of a cutout, is formed in a central portion in the front-rear direction of the left edge of the maintenance cover 6. The finger recess 8 is cut from the left edge of the maintenance cover 6 into a rectangular shape in the plan view. As shown in FIGS. 7 and 8, the finger recess 8 is recessed downward from an upper surface of the maintenance cover 6 and is open upward and leftward. The discharge cover 4 is opened by inserting a fingertip into the finger recess 8 and pushing the upper edge of the discharge cover 4 leftward when the discharge cover 4 and the maintenance cover 6 are both closed. The maintenance cover 6 is opened by inserting a fingertip into the finger recess 8 and lifting up the left edge of the maintenance cover 6 when the discharge cover 4 and the maintenance cover 6 are both closed.

The image scanning device 1 comprises an anti-fall member 65. The anti-fall member 65 is stored in the discharge cover 4 when the discharge cover 4 is closed. As shown in FIGS. 3, 4, 7, and 8, when the discharge cover 4 is open, the anti-fall member 65 is pivotable from a stored position in which the anti-fall member 65 is directed frontward to an extending position in which the anti-fall member 65 is directed upward.

The anti-fall member 65 comprises an extending portion 66 and a stopper 67. When the anti-fall member 65 is in the extending position, the extending portion 66 extends upward and leftward, and the stopper 67 protrudes upward and rightward. The stopper 67 is configured to contact a postcard discharged along the one-way path 42, and to stop the postcard from falling outside the image scanning device 1.

A feed portion 11 and a discharge portion 12 are disposed in the housing 2 at positions which are exposed when the tray 3 is in the use position.

The feed portion 11 is disposed below the discharge portion 12. An upper surface of the feed portion 11, except for a right end portion, is a flat surface extending in the front-rear direction and in the left-right direction. The right end portion of the upper surface of the feed portion 11 gently curves and inclines upward and rightward so as to protrude downward. The right end portion provides a minute clearance for a lower end of an inner surface of the tray 3 which is in the use position.

The feed portion 11 comprises a pair of sheet-width guides 13 which are opposite to each other in the front-rear direction. The sheet-width guides 13 are configured to move closer to or away from each other by an equal distance relative to the center therebetween.

As shown in FIG. 3, when the sheet-width guides 13 are closest to each other, a distance therebetween corresponds to the smallest width which is substantially equal to the length of the short side of the European and American business card size. In this state, when a sheet having such a size is inserted between the sheet-width guides 13 from the right, the sheet is placed and center-aligned on the feed portion 11.

As shown in FIG. 1, when the sheet-width guides 13 are most distant from each other, a distance therebetween corresponds to the largest width which is substantially equal to the length of the short side of the legal size. In this state, when a sheet having such a size is inserted between the sheet-width guides 13 from the right, the sheet is placed and center-aligned on the feed portion 11 and the tray 3.

When a sheet having a size greater than the European and American business card size and less than the legal size is placed on the feed portion 11, a distance between the sheet-width guides 13 is adjusted according to the width of the sheet in the front-rear direction.

The discharge portion 12 is disposed above the feed portion 11 while leaving a space therebetween. The discharge portion 12 has a rectangular plate shape which extends in the front-rear direction and in the left-right direction. A sheet is discharged rightward from the inside of the housing 2 onto the discharge portion 12. A right edge portion of the sheet passes the discharge portion 12 and is placed on the tray 3. The left edge portion of the sheet remains on the discharge portion 12. Because the left edge portion of the sheet remains on the discharge portion 12, a part of the sheet does not overlap a sheet placed over the feed portion 11 and the tray 3.

As shown in FIGS. 2, 4, 6, and 8, a common path 14 is defined inside the housing 2. The common path 14 extends leftward from the left end of the feed portion 11, bends to extend obliquely downward and leftward, and further bends to extend leftward.

A feed roller 15, which is an example of a feeding mechanism, a separation roller 16, a first LF roller 17, a driven roller 18, second LF rollers 19, and driven rollers 20, 21, which are part of an example of a conveying mechanism, are disposed along the common path.

The feed roller 15 is disposed at an entrance of the common path 14. The feed roller 15 is rotatable about an axis extending in the front-rear direction.

The separation roller 16 is disposed leftward of the feed roller 15 while leaving a space therebetween. The separation roller 16 is rotatable about an axis extending in the front-rear direction. A separation member 22 is disposed above the separation roller 16. The separation roller 22, which may be made of rubber, is in elastic contact with the periphery of the separation roller 16 from above.

The first LF roller 17 and the driven roller 18 are disposed opposite to each other across a portion of the common path 14 which is inclined downward and leftward. The first LF roller 17 and the driven roller 18 are each rotatable about an axis extending in the front-rear direction. The periphery of the driven roller 18 is in contact with the periphery of the first LF roller 17 from below.

The second LF rollers 19 and the driven rollers 20, 21 are disposed in the vicinity of an exit of the common path 14.

Figure 9:
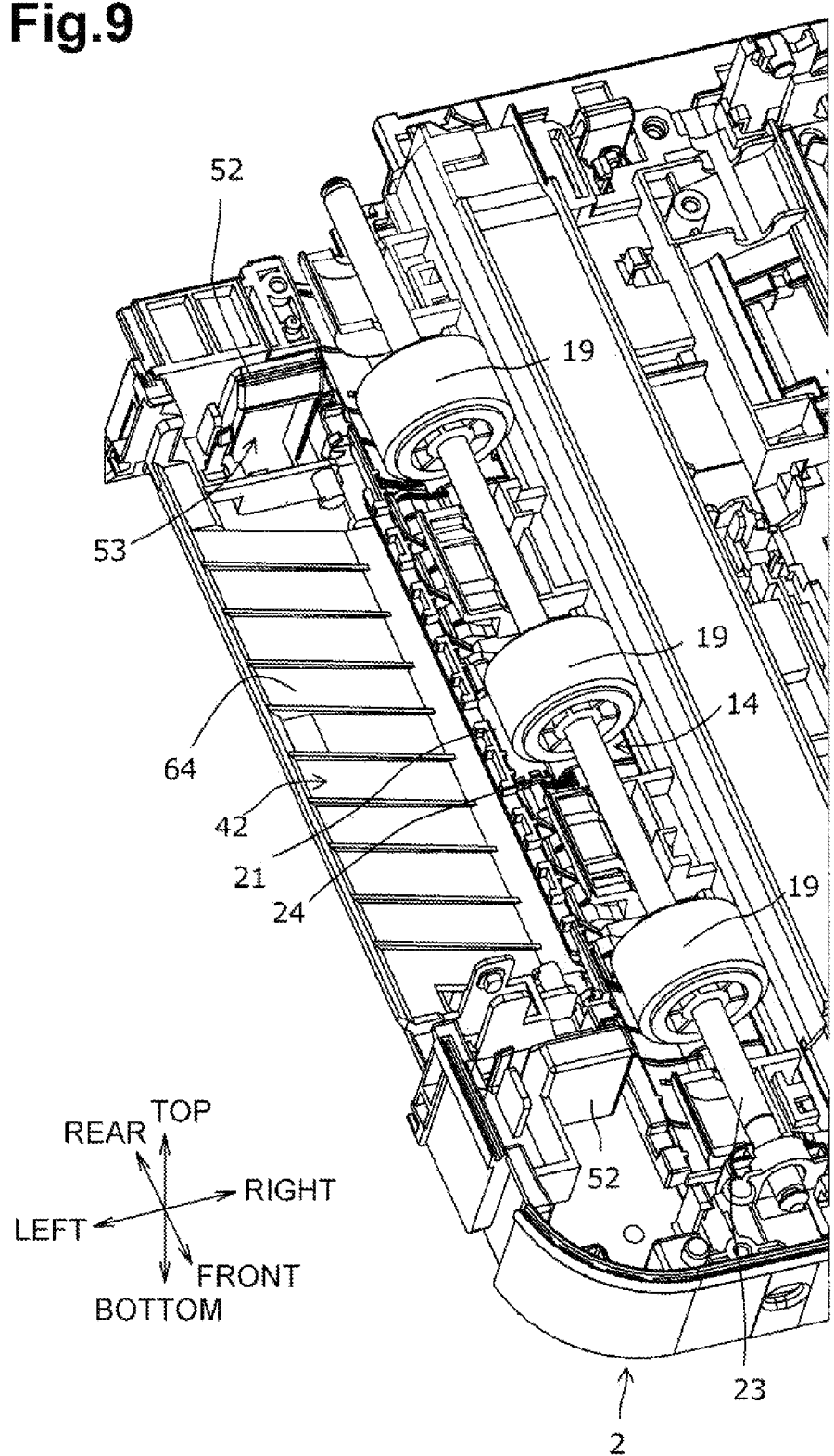
FIG. 9 is a perspective view of a left end portion inside a housing of the image scanning device.

As shown in FIG. 9, the three second LF rollers 19 are disposed in the front-rear direction. The three second LF rollers 19 are disposed at intervals on a common rotary shaft 23 which extends in the front-rear direction. The second LF roller 19 in the middle is disposed at the center in the front-rear direction of the housing 2. Opposite ends of the rotary shaft 23 are rotatably supported by the housing 2. Accordingly, the three second LF rollers 19 are rotatable about the rotary shaft 23.

As shown in the FIGS. 2, 3, 6, and 8, the driven rollers 20 are disposed opposite to the second LF rollers 19 respectively across the common path 14. The driven rollers 20 are rotatable about an axis extending in the front-rear direction. The periphery of each driven roller 20 is in contact with the periphery of a corresponding second LF roller 19 at a position slightly right from the lowest point.

As shown in FIG. 9, the driven roller 21 is disposed opposite to the second LF roller 19 in the middle, across the common path 14. No driven roller 21 is provided for each of the second LF rollers 19 at the front and rear. The driven roller 21 is rotatable about an axis extending in the front-rear direction. The periphery of the driven roller 21 is in contact with the periphery of the second LF roller 19 in the middle at a position slightly left from the lowest point.

The driven roller 21 is disposed opposite to the second LF roller 19 in the middle only because the second LF roller 19 and the driven roller 21 are configured to convey a postcard or the like when the discharge cover 4 is open and when the postcard or the like is conveyed along the one-way path 42, as will be described later.

Figure 10:
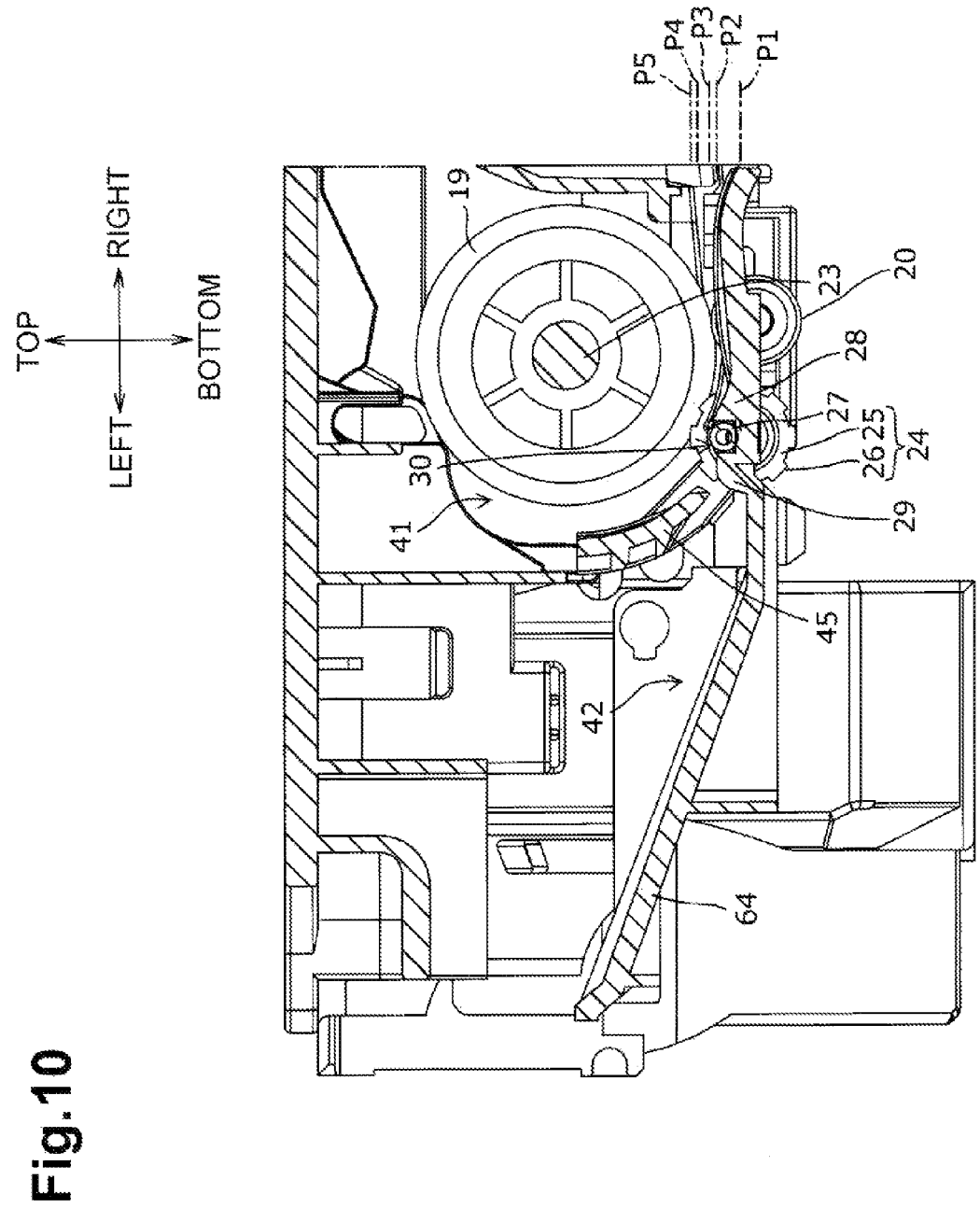
FIG. 10 is a cross-sectional view of a second LF roller and its vicinity of the image scanning device, showing that a flapper extends along a return path.
Figure 11:
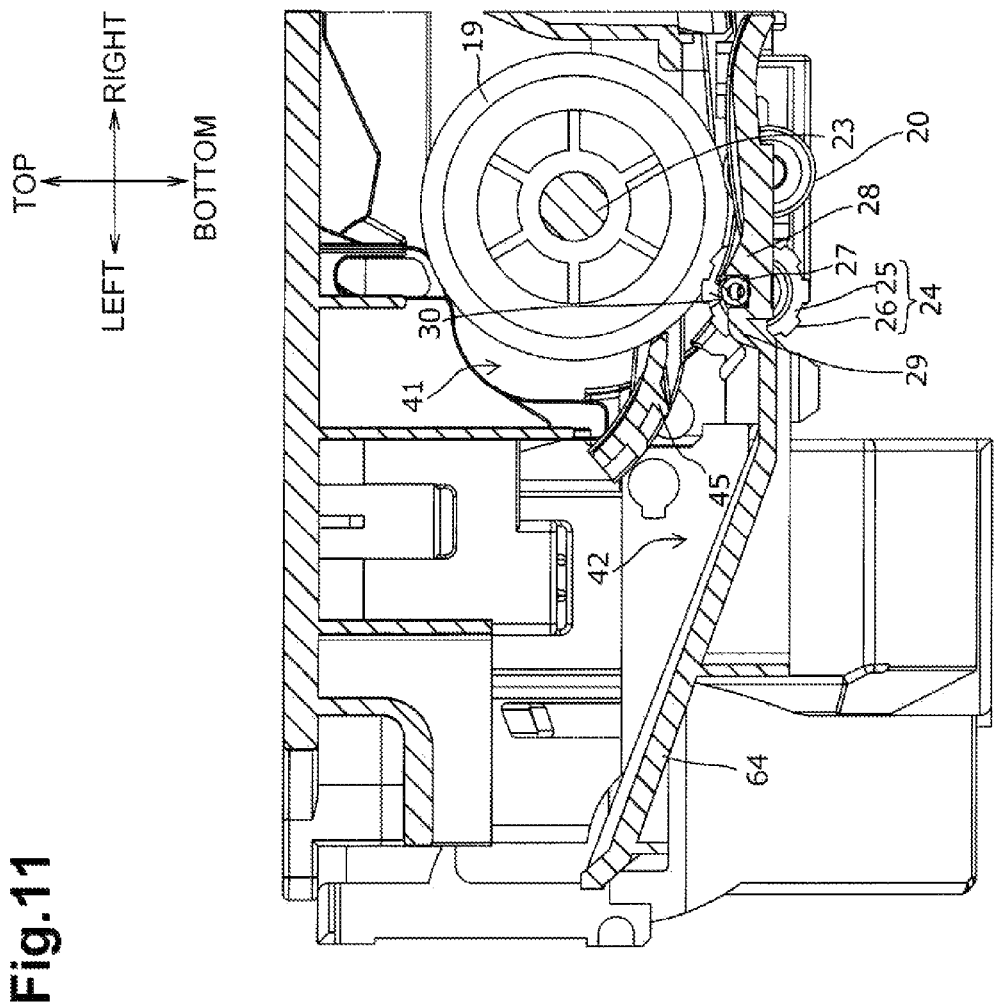
FIG. 11 is a cross-sectional view of a second LF roller and its vicinity of the image scanning device, showing that a flapper extends along a one-way path.

A pushing member 24 is disposed on both sides of the drive roller 21 in the front-rear direction. As shown in FIGS. 10 and 11, the pushing member 24 comprises a disk-shaped main body 25 and a plurality of protrusions 26 which is integrally formed with the main body to protrude radially from the periphery of the main body 25. The rotary shaft 27, which is commonly used for the driven roller 21, is inserted into the center of the main body 25 such that the main body 25 is not rotatable relative to the rotary shaft 27.

As shown in FIGS. 10 and 11, an upstream protrusion 28 and a downstream protrusion 29, which are plate-shaped, are disposed in the vicinity of the exit of the common path 14 on either outer side of the common path 14 in the front-rear direction.

The upstream protrusion 28 is disposed on the right side of the rotary shaft 27 and extends in the left-right direction. The upstream protrusion 28 protrudes upward beyond a lower surface of the common path 14, and has a triangular shape so as to protrude gradually from the right to the left, as viewed from the front. As shown in FIG. 10, the highest position P3 of the upstream protrusion 28 is higher than the axis of the driven roller 21, i.e., an axis position P1 of the rotary shaft 27, and is lower than the highest position P4 of the periphery of the driven roller 21.

The downstream protrusion 29 is disposed on the left side of the rotary shaft 27 and extends in the left-right direction. The downstream protrusion 29 protrudes upward beyond the lower surface of the common path 14. An upper end position P2 of the downstream protrusion 29 is higher than the axis position P1 of the rotary shaft 27 and is lower than the highest position P4 of the periphery of the driven roller 21. A rear end of the downstream protrusion 29 is positioned leftward of the pushing member 24.

A shaft holding portion 30 is formed between the upstream protrusion 28 and the downstream protrusion 29 so as to rotatably hold an end portion of the rotary shaft 27. In this way, the driven roller 21 and the pushing member 24 are rotatably supported on the rotary shaft 27. A distance P1-P5 between the axis of the pushing member 24 and a protruding end of the protrusion 26 of the pushing member 24 is greater than a distance P1-P4 between the axis of the pushing member 24 and the periphery of the driven roller 21.

As shown in FIGS. 2, 4, 6, and 8, between the first LF roller 17 and the second LF roller 19, the common path 14 extends along a first contact glass 31 and a second contact glass 32.

The first contact glass 31 is a thin, rectangular plate elongated in the left-right direction. A width of the first contact glass 31 in the front-rear direction is substantially equal to a width of the common path 14 in the front-rear direction. The common path 14 extends over a left end portion of the first contact glass 31.

A CIS (contact image sensor) module 33 is disposed below the first contact glass 31 movably in the left-right direction. The CIS module 33 comprises therein LED lights, lenses, and an image sensor. Under normal conditions, the CIS module 33 is disposed opposite to the left end portion of the first contact glass 31.

The housing 2 is divided into an upper portion and a lower portion. A rear end of the upper portion of the housing 2 is connected to a rear end of the lower portion of the housing 2 by way of a hinge (not shown). The upper portion of the housing 2 is swingable about the hinge relative to the lower portion. When a front end of the upper portion of the housing 2 is raised, the first contact glass 31 is exposed. The CIS module is configured to scan an image of a document placed on the first contact glass 31.

The second contact glass 32 is opposite to the common path 14 from above. The second contact glass 32 is a thin, rectangular plate elongated in the front-rear direction. A width of the second contact glass 32 in the front-rear direction is substantially equal to the width of the common path 14 in the front-rear direction.

A CIS (contact image sensor) module 34 is disposed above the second contact glass 32 movably in the left-right direction. The CIS module 34 comprises therein LED lights, lenses, and an image sensor.

The return path 41 and the one-way path 42 are defined inside the housing 2.

The return path 41 is defined by a cover-side convey guide 43, which is formed by an inner surface of the maintenance cover 6, the periphery of each second LF roller 19, and an upper surface of a housing-side convey guide 63. The cover-side convey guide 43 is an example of a conveying guide. The housing-side convey guide 63 has a thin plate shape. The housing-side convey guide 63 extends rightward from a position which leaves a minute clearance on the right side relative to the highest position of the periphery of each second LF roller 19. The right end of the housing-side convey guide 63 is disposed at a position which leaves a minute clearance on the left side relative to the discharge portion 12. The return path 41 curves from the exit of the common path 14 upward along the periphery of each second LF roller 19, and extends rightward from the highest position of the periphery of each second LF roller 19. The exit of the return path 41 is positioned in the vicinity of the left end of the discharge portion 12. A width of the return path 41 in the front-rear direction is substantially equal to the width of the common path 14 in the front-rear direction. The cover-side convey guide 43 and the housing-side convey guide 63 are part of an example of the conveying mechanism.

A driven roller 44 is disposed at the top left of the corresponding second LF roller 19, across the return path 41. The driven roller 44 is rotatable about an axis extending in the front-rear direction. The periphery of the driven roller 44 is in contact with the periphery of the corresponding second LF roller 19 from the top left.

The one-way path 42 extends obliquely upward and leftward from the exit of the common path 14.

Specifically, a convey guide 64 is disposed leftward of the driven roller 21. The convey guide 64 has a thin plate shape. The convey guide 64 extends leftward shortly from the proximity of a central position in the top-bottom direction of the periphery of the driven roller 21, and bends upward and leftward. A left end of the convey guide 64 is disposed in the proximity of a lower end of the discharge cover 4. As shown in FIG. 9, a length of the convey guide 64 in the front-rear direction is slightly smaller than a distance between a rear end face of the front second LF roller 19 and a front end face of the rear second LF roller. The one-way path 42 is defined as a space which extends upward and leftward from a position between a right end of the convey guide 64 and a flapper 45 (to be described later), along an upper surface of the convey guide 64. The convey guide 64 and the flapper 45 are part of an example of the conveying mechanism.

An entrance of the one-way path 42 is opposite to a central portion in the front-rear direction of the exit of the common path 14. A width of the one-way path 41 in the front-rear direction is smaller than the width of the common path 14 in the front-rear direction. An exit of the one-way path 42 is positioned in the proximity of a lower end of the discharge cover 4. An angle of inclination of the one-way path 42 relative to the horizontal surface HS is smaller than an angle of inclination of the discharge cover 4, which is open, relative to the horizontal surface HS. The angle is, for example, 20 degrees.

The flapper 45 is disposed at a junction of the return path 41 and the one-way path 42. The flapper 45 is swingable, about a swing axis extending in the front-rear direction, between a position shown in FIG. 10 and a position shown in FIG. 11.

The flapper 45 in the position shown in FIG. 10 extends along the return path 41 such that a lower end thereof closes the one-way path 42. The flapper 45 in the position shown in FIG. 11 extends along the one-way path 42 such that a right end thereof closes the return path 41, thereby allowing the sheet to enter from the common path 14 to the one-way path 42.

The flapper 45 is shifted between the position shown in FIG. 10 and the position shown in FIG. 11 in response to opening and closing of the discharge cover 4. Specifically, as shown in FIGS. 2, 4, 6, and 8, a link mechanism 46 is provided to swing the flapper 4 in response to opening and closing the discharge cover 4. The link mechanism 46 is configured to move the flapper 45 to the position shown in FIG. 10 when the discharge cover 4 is closed, and to move the flapper 45 to the position shown in FIG. 11 when the discharge cover 4 is opened.

As shown in FIG. 12, a space 48 is defined in a left rear corner portion of the housing 2. FIG. 12 shows a state in which the convey guide 64 is removed. Specifically, the space 48 is defined between a rear edge of the convey guide 64 and a rear wall 47, and is not used as the one-way path 42. The space 48 is effectively used to store a motor 49 which drives the feed roller 15, the separation roller 16, the first LF roller 17, and the second LF rollers 17.

As shown in FIGS. 2, 4, 6, and 8, a space 50 is defined below a left end of the one-way path 42 which inclines upward and leftward. The image scanning device 1 swings about a swing axis extending in the left-right direction between a position along the horizontal surface HS and a position in which a front end of the image scanning device 1 is raised relative to the printer (not shown). The space 50 is effectively used to store a support arm 51 for supporting the image scanning device 1 in a state in which the front end thereof is raised relative to the printer.

As shown in FIG. 9, engaged portions 52 stand on opposite sides of the one-way path 42 in the front-rear direction. The engaged portions 52 each have a rectangular parallelepiped shape. A rectangular-shaped recess 53 is formed in an inner surface in the front-rear direction of each engaged portion 52. As shown in FIG. 5, hooked engaging portions 54 are formed in an inner surface of the maintenance cover 6 respectively for the engaged portions 52. When the maintenance cover 6 is closed, a free end portion of each engaging portion 54 fits into the corresponding recess 53, and each engaging portion 54 engages the corresponding engaged portion 52. Consequently, the maintenance cover 6 is maintained closed.

The image scanning device 1 configured, using an ADF (automatic document feeder), to scan images on both sides of the sheet simultaneously, or to scan an image on one side of the sheet selectively. Sheet feeding and image reading will be explained below in a time sequence.

When, for example, A4-size sheets are used, the discharge cover 4 is closed. As shown in FIG. 1, a distance between the side width guides 13 is adjusted roughly to a length of the short side of the A4-size sheet while the tray 3 is open relative to the housing 2. Then the sheets are inserted between the sheet width guides 13 from the right. The distance between the side width guides 13 is adjusted to a length in the front-rear direction of the inserted sheets. In this way, the sheets are placed on the feed portion 11 and the tray 3.

Leading edges of the sheets are positioned on the periphery of the feed roller 15, which is an example of a feeding mechanism. When the feed roller 15 rotates counterclockwise as viewed from the front, the lowermost sheet is fed into the common path 14 by a friction force generated between a lower surface of the lowermost sheet and the periphery of the feed roller 15.

The separation roller 16 rotates counterclockwise as viewed from the front. When the leading edge of the sheet contacts a contact portion between the periphery of the separation roller 16 and the separation member 22, the rotation of the separation roller 16 causes the sheet to enter between the periphery of the separation roller 16 and the separation member 22. The sheet is properly separated one by one by a friction force applied to the sheet from the periphery of the separation roller 16 and the separation member 22. The sheet passes between the periphery of the separation roller 16 and the separation member 22.

The first LF roller 17 rotates clockwise as viewed from the front. The rotation of the first LF roller 17 causes the driven roller 18 to rotate counterclockwise as viewed from the front. When the leading edge of the sheet contacts a contact portion between the periphery of the first LF roller 17 and the periphery of the driven roller 18, the rotation of the first LF roller 17 causes the leading edge of the sheet to enter between the periphery of the first LF roller 17 and the periphery of the driven roller 18. The first LF roller 17 applies a conveying force to the sheet.

When the sheet is conveyed further, a lower surface of the sheet faces the first contact glass 31. The CIS module 33 irradiates the lower surface of the sheet on the first contact glass 31. The image sensor of the CIS module 33 receives reflected light from the lower surface of the sheet, thereby to scan an image on the lower surface of the sheet.

On the other hand, an upper surface of the sheet faces the second contact glass 32. The CIS module 34 irradiates the upper surface of the sheet below the second contact glass 32. The image sensor of the CIS module 34 receives reflected light from the upper surface of the sheet, thereby to scan an image on the upper surface of the sheet.

Then the leading edge of the sheet contacts contact portions between the peripheries of the second LF rollers 19 and the peripheries of the driven rollers 20. The second LF rollers 19 rotate clockwise as viewed from the front. The rotation of each second LF roller 19 causes the corresponding driven roller 20 to rotate counterclockwise as viewed from the front. This causes the leading edge of the sheet to enter between the peripheries of the second LF rollers 19 and the peripheries of driven rollers 20. The second LF rollers 19 apply a conveying force to the sheet.

Then the leading edge of the sheet contacts a contact portion between the periphery of the second LF roller 19 and the periphery of the driven roller 21. The rotation of the second LF roller 19 causes the driven roller 21 to rotate counterclockwise as viewed from the front. This causes the leading edge of the sheet to enter between the periphery of the second LF roller 19 and the periphery of the driven roller 21. The second LF roller 19 applies a conveying force to the sheet.

At this time, because the discharge cover 4 is closed, the flapper 45 is in the position shown in FIG. 10. The sheet conveyed from the periphery of the second LF roller 19 and the periphery of the driven roller 21 is conveyed in the return path 41 while the leading edge of the sheet moves along the flapper 45.

The sheet conveyed in the return path 41 moves toward a contact portion between the periphery of the second LF roller 19 and the periphery of the driven roller 44. The rotation of the second LF roller 19 causes the driven roller 44 to rotate counterclockwise as viewed from the front. When the leading edge of the sheet contacts a contact portion between the periphery of the second LF roller 19 and the periphery of the driven roller 44, the leading edge of the sheet enters between the periphery of the second LF roller 19 and the periphery of the driven roller 44. The second LF roller 19 applies a conveying force to the sheet.

Then when a trailing edge of the sheet leaves the contact portion between the periphery of the second LF roller 19 and the periphery of the driven roller 44, the sheet is discharged onto the discharge portion 12 and the tray 3 and extends thereover.

When, for example, a relatively rigid sheet such as a postcard is used, the discharge cover 4 is opened. As shown in FIG. 1, a distance between the side width guides 13 is adjusted roughly to a length of the short side of the sheet while the tray 3 is open relative to the housing 2. Then the sheet is inserted between the sheet width guides 13 from the right. The distance between the side width guides 13 is adjusted to a length in the front-rear direction of the inserted sheet. In this way, the sheet such as a postcard is placed on the feed portion 11.

A leading edge of the sheet is positioned on the periphery of the feed roller 15. When the feed roller 15 rotates counterclockwise as viewed from the front, the sheet is fed into the common path 14 by a friction force generated between a lower surface of the sheet and the periphery of the feed roller 15.

The separation roller 16 rotates counterclockwise as viewed from the front. When the leading edge of the sheet contacts a contact portion between the periphery of the separation roller 16 and the separation member 22, the rotation of the separation roller 16 causes the sheet to enter between the periphery of the separation roller 16 and the separation member 22. The sheet passes between the periphery of the separation roller 16 and the separation member 22.

The first LF roller 17 rotates clockwise as viewed from the front. The rotation of the first LF roller 17 causes the driven roller 18 to rotate counterclockwise as viewed from the front. When the leading edge of the sheet contacts a contact portion between the periphery of the first LF roller 17 and the periphery of the driven roller 18, the rotation of the first LF roller 17 causes the leading edge of the sheet to enter between the periphery of the first LF roller 17 and the periphery of the driven roller 18. The first LF roller 17 applies a conveying force to the sheet.

When the sheet is conveyed further, a lower surface of the sheet faces the first contact glass 31. The CIS module 33 irradiates the lower surface of the sheet on the first contact glass 31. The image sensor of the CIS module 33 receives reflected light from the lower surface of the sheet, thereby to scan an image on the lower surface of the sheet.

On the other hand, an upper surface of the sheet faces the second contact glass 32. The CIS module 34 irradiates the upper surface of the sheet below the second contact glass 32. The image sensor of the CIS module 34 receives reflected light from the upper surface of the sheet, thereby to scan an image on the upper surface of the sheet.

Then the leading edge of the sheet contacts contact portions between the peripheries of the second LF rollers 19 and the peripheries of the driven rollers 20. The second LF rollers 19 rotate clockwise as viewed from the front. The rotation of each second LF roller 19 causes the corresponding driven roller 20 to rotate counterclockwise as viewed from the front. This causes the leading edge of the sheet to enter between the peripheries of the second LF rollers 19 and the peripheries of driven rollers 20. The second LF rollers 19 apply a conveying force to the sheet.

Then the leading edge of the sheet contacts a contact portion between the periphery of the second LF roller 19 and the periphery of the driven roller 21. The rotation of the second LF roller 19 causes the driven roller 21 to rotate counterclockwise as viewed from the front. This causes the leading edge of the sheet to enter between the periphery of the second LF roller 19 and the periphery of the driven roller 21. The second LF roller 19 applies a conveying force to the sheet.

At this time, because the discharge cover 4 is open, the flapper 45 is in the position shown in FIG. 11. The flopper 45 allows the sheet to enter from the common path 14 to the one-way path 42. The sheet conveyed from the periphery of the second LF roller 19 and the periphery of the driven roller 21 is conveyed along the one-way path 42.

Then when a trailing edge of the sheet leaves the contact portion between the periphery of the second LF roller 19 and the periphery of the driven roller 21, the sheet is discharged such that the leading edge thereof is positioned on the discharge cover 4.

At this time, because the sheet is relatively rigid, the leading edge of the sheet may contact the discharge cover 4 or an upper surface of the one-way path 42, and the trailing edge of the sheet may remain on the periphery of the driven roller 21. In this case, the protrusions 26 of the pushing members 24, which rotate together with the driven roller 21, contact and push leftward the trailing edge of the sheet. Consequently, the trailing edge of the sheet falls off the periphery of the driven roller 21, and the sheet is discharged completely.

The sheet is conveyed leftward along the common path 14. The sheet conveyed leftward from the common path 14 to the return path 41 is turned around rightward along the return path 41. The sheet conveyed from the common path 14 to the one-way path 42 is conveyed leftward along the one-way path 42.

The discharge cover 4 is openably and closably disposed in the housing 2. When the discharge cover 4 is open, the discharge port 5 is defined. In this state, the sheet conveyed along the one-way path 42 is discharged through the discharge port 5. The sheet discharged through the discharge port 5 is received by the discharge cover 4.

Also, the maintenance cover 6 is openably and closably disposed in the housing 2. When the maintenance cover 6 is open, the return path 41 and the one-way path 42 are exposed. If a sheet jam occurs in the return path 41 or in the one-way path 42, the sheet jam can be removed by opening the maintenance cover 6.

Because the discharge cover 4 and the maintenance cover 6 are provided separately, the user can easily understand the functions of the discharge cover 4 and the maintenance cover 6. Accordingly, this structure may reduce the confusion of the user about a sheet discharge operation and a jam removal operation.

The dimension of the maintenance cover 6 in the front-rear direction is greater than that of the discharge cover 4.

This allows the user to easily distinguish between the discharge cover 4 and the maintenance cover 6, and may further reduce the confusion of the user about a sheet discharge operation and a jam removal operation. The maintenance cover 6 of a relatively large size provides operability for jam removal.

The discharge cover 4 is opened and closed by being pivoted about the pivot shaft 61. The maintenance cover 6 is opened and closed by being pivoted about the pivot shaft 62. When the discharge cover 4 and the maintenance cover 6 are closed, the free end edge of the maintenance cover 6 extends along the free end edge of the discharge cover 4. The discharge cover 4 and the maintenance cover 6 are opened in opposite directions.

If the discharge cover 4 and the maintenance cover 6 were configured to be opened in the same direction, one of the discharge cover 4 and the maintenance cover 6 which is open might prevent the other from being opened. In this embodiment, however, the discharge cover 4 which is open does not interfere with the maintenance cover 6 being opened, and the maintenance cover 6 which is open does not interfere with the discharge cover 4 being opened. Regardless of whether one of the discharge cover 4 and the maintenance cover 6 is open or closed, the other can be opened and closed.

When the discharge cover 4 is open, the inside of the discharge port 5 is visible from the top left of the image scanning device 1. When the maintenance cover 6 is open, the inside of the maintenance opening 7 is visible from the top left of the image scanning device 1. The inside of the discharge port 5 and the inside of the maintenance opening 7 are visible from the same direction.

The maintenance cover 6 has the finger recess 8 for an open/close operation.

When the discharge cover 4 and the maintenance cover 6 are both closed, the discharge cover 4 or the maintenance cover 6 can be opened with a fingertip inserted in the finger recess 8.

When the discharge cover 4 and the maintenance cover 6 are both opened, a relatively large opening is defined by the discharge port 5 and the maintenance opening 7 which communicate with each other. This may provide improved operability for jam removal.

The one-way path 42 is disposed leftward of the return path 41. The engaged portions 52 are disposed on the opposite sides of the one-way path 41 in the front-rear direction. The maintenance cover 6 comprises the engaging portions 54 engageable with the engaged portions 52.

The maintenance cover 6 is maintained closed by the engagement of the engaging portions 54 with the engaged portions 52. Because the engaged portions 52 are disposed outside the one-way path 42 in the front-rear direction, the engaged portions 52 and the engaging portions 54 do not interfere with the sheet conveyed along the one-way path 42. Because the width in the front-rear direction of the one-way path 42 is less than the width in the front-rear direction of the return path 41, spaces left outside the one-way path 42 in the front-rear direction can be effectively used as spaces for disposing the engaged portions 57. Accordingly, the maintenance cover 6 is configured to be maintained closed without affecting the sheet conveying performance and increasing the size of the image scanning device in the front-rear direction.

The space 48, which is defined between the rear edge of the convey guide 64 and the rear wall 47 of the housing 2, is not used as the one-way path 42. The space 48 is effectively used for disposing the motor 49 which drives the feed roller 15, the separation roller 16, the first LF roller 17, and the second LF rollers 19.

Although, in the above-described embodiment, the finger recess 8 is formed in the maintenance cover 6, a rectangular cutout may be formed from the upper edge of the discharge cover 4 in a central portion in the front-rear direction. A cutout as a finger recess may be formed each in the discharge cover 4 and in the maintenance cover 6.

Although postcards are taken as an example of relatively rigid sheets in the above-described embodiment, business cards, credit cards, or the like may be conveyed instead. Although relatively rigid sheets are taken as an example of sheets conveyed along the one-way path 42 in the above-described embodiment, relatively flexible sheets, e.g., sales receipts may be conveyed instead.

Although the image scanning device 1 is described as a multi-function device which is compact in size and includes a printer as well, the image scanning device 1 may be a standalone device.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image scanning device comprising:
   a housing;
   a scanning unit disposed inside the housing and configured to scan, at a scanning position, an image of a sheet;
   a conveying mechanism disposed inside the housing and configured to convey the sheet along a common path to the scanning position in a first direction, and to convey the sheet having passed the scanning position selectively along a return path in a second direction and along a one-way path in the first direction, the conveying mechanism comprising a path switching member configured to move between a first position in which the path switching member guides, along the one-way path, a document having passed the scanning position, and a second position in which the path switching member guides, along the return path, the document having passed the scanning position;
   a discharge cover openably and closably disposed in the housing and configured, when open relative to the housing, to uncover a discharge port and receive the sheet conveyed along the one-way path and discharged through the discharge port; and
   a maintenance cover openably and closably disposed in the housing and configured, when open relative to the housing, to expose the return path and the one-way path, which extends from the path switching member to the discharge port.

2. The image scanning device according to claim 1, wherein the second direction is opposite to the first direction.

3. The image scanning device according to claim 1, wherein a dimension of the maintenance cover in a width direction which is perpendicular to the first direction and a vertical direction is greater than a dimension of the discharge cover in the width direction.

4. The image scanning device according to claim 1,
   wherein the discharge cover is configured to pivot about a first pivot axis so as to be open and closed relative to the housing, and the maintenance cover is configured to pivot about a second pivot axis different from the first pivot axis so as to be open and closed relative to the housing,
   wherein a free end edge of the maintenance cover extends along a free end edge of the discharge cover when the discharge cover and the maintenance cover are closed, and
   wherein the discharge cover and the maintenance cover are configured to be opened in opposite directions.

5. The image scanning device according to claim 4, wherein at least one of the discharge cover and the maintenance cover has a cutout formed at a free end of the at least one of the discharge cover and the maintenance cover for opening and closing the at least one of the discharge cover and the maintenance cover.

6. The image scanning device according to claim 4, wherein when the maintenance cover is open, the maintenance cover and the housing define a maintenance opening which communicates with the discharge port.

7. The image scanning device according to claim 6,
   wherein the maintenance opening is defined in a surface extending between upper edges of opposite side surfaces of the housing in the first direction, and
   wherein the second pivot axis is upstream of a free end of the maintenance cover in the first direction.

8. The image scanning device according to claim 7,
   wherein the conveying mechanism is configured such that the one-way path is downstream of the return path in the first direction,
   wherein the image scanning device further comprises an engaged portion disposed on at least one side of the one-way path in a width direction perpendicular to the first direction and a vertical direction, and
   wherein the maintenance cover comprises an engaging portion configured to engage the engaged portion.

9. The image scanning device according to claim 7, wherein the conveying mechanism comprises a pair of conveying guides which are opposite to each other and define the return path, and an inner surface of the maintenance cover, when closed, forms one of the pair of conveying guides.

10. The image scanning device according to claim 1, further comprising a motor configured to generate a driving force for conveying the sheet, wherein the motor is disposed on one side of the one-way path in a width direction perpendicular to the first direction and a vertical direction.

11. The image scanning device according to claim 10, wherein the conveying mechanism is configured such that the one-way path is downstream of the return path in the first direction.

12. The image scanning device according to claim 1, further comprising:
    a tray configured to hold a stack of sheets; and
    a feeding mechanism configured to feed sheets sequentially starting from the sheet at a lowermost position in the stack,
    wherein the conveying mechanism is configured to convey the sheet fed from the tray, and
    wherein the scanning unit comprises a first scanning member configured to scan an image on one side of the sheet conveyed by the conveying mechanism, and a second scanning member configured to scan an image on the other side of the sheet conveyed by the conveying mechanism.

13. The image scanning device according to claim 12,
    wherein the first scanning member is disposed opposite to the common path and is configured to scan the image on one side of the sheet being conveyed along the common path, and
    wherein the second scanning member is disposed opposite to the common path and is configured to scan the image on the other side of the sheet being conveyed along the common path.

14. The image scanning device according to claim 1,
    wherein the conveying mechanism is configured such that the one-way path is downstream of the return path in the first direction,
    wherein the image scanning device further comprises an engaged portion disposed on at least one side of the one-way path in a width direction perpendicular to the first direction and a vertical direction, and wherein the maintenance cover comprises an engaging portion configured to engage the engaged portion.

15. The image scanning device according to claim 6, wherein when the maintenance cover is open and the discharge cover is open, the discharge port and the maintenance opening communicate with each other to define a larger opening than the maintenance opening.

16. The image scanning device according to claim 15, wherein the larger opening provides access to both the one-way path and the return path.

17. The image scanning device according to claim 1, further comprising a link mechanism configured to link the discharge cover to the path switching member such that the path switching member moves between the first position and the second position in response to opening and closing of the discharge cover.

* * * * *